United States Patent [19]

Shepheard

[11] Patent Number: 4,715,077
[45] Date of Patent: * Dec. 29, 1987

[54] CONDUIT ON PASSENGER LOADING BRIDGE

[75] Inventor: Thomas E. Shepheard, Norfolk, Va.

[73] Assignee: Air-A-Plane Corporation, Norfolk, Va.

[*] Notice: The portion of the term of this patent subsequent to Nov. 4, 2003 has been disclaimed.

[21] Appl. No.: 900,850

[22] Filed: Aug. 27, 1986

Related U.S. Application Data

[63] Continuation-in-part of Ser. No. 798,960, Nov. 18, 1985, Pat. No. 4,620,339.

[51] Int. Cl.$^4$ .............................................. E01D 1/00
[52] U.S. Cl. ........................................ 14/71.5; 248/49; 98/2.15; 98/40.19; 98/DIG. 7; 138/114; 237/12.3 R
[58] Field of Search ............ 14/71.5; 191/12 R, 12 C; 244/114 R; 248/49; 165/41, 42, 83, 137; 285/62, 137.1, 302; 98/2.05, 2.08, 2.14, 2.15, 40.04, 40.05, 40.19, DIG. 7; 138/38, 114; 237/12.3 R

[56] References Cited

U.S. PATENT DOCUMENTS

| | | | |
|---|---|---|---|
| 2,395,485 | 2/1946 | Jones | 191/12 R X |
| 2,935,080 | 5/1960 | Klimek | 191/12 R X |
| 3,253,083 | 5/1966 | Timbers | 248/49 X |
| 3,284,036 | 11/1966 | Nansel | 248/49 |
| 3,305,220 | 2/1967 | Nevulis | 191/12 R X |
| 3,399,545 | 9/1968 | Anderson et al. | 285/61 X |
| 3,410,415 | 11/1968 | Becker et al. | 191/12 R X |
| 3,433,889 | 3/1969 | De Vries, Jr. | 191/12 R X |
| 3,521,316 | 7/1970 | Adams et al. | 14/71.5 |
| 3,779,003 | 12/1973 | Boissevain et al. | 248/49 X |
| 3,859,481 | 1/1975 | Sprague | 14/71.5 X |
| 4,311,293 | 1/1982 | Tenniswood | 248/49 |
| 4,526,090 | 7/1985 | Maier | 14/71.5 X |
| 4,572,550 | 2/1986 | Harder | 14/71.5 X |

FOREIGN PATENT DOCUMENTS

2415771 9/1979 France .................. 14/71.5

Primary Examiner—Stephen J. Novosad
Assistant Examiner—John F. Letchford
Attorney, Agent, or Firm—Nies, Webner, Kurz & Bergert

[57] ABSTRACT

An extensible loading bridge for aircraft having an inboard end connected to a terminal and an outboard end adapted for connection to a parked aircraft. A heat exchanger on the outboard end supplies warm or cold air to the aircraft. Hot or cold liquid is supplied to the outboard heat exchanger from a source at the terminal end of the bridge and extensible flexible supply and return lines convey the hot or cold glycol to or from the outboard heat exchanger. A means is provided for maintaining the supply and return lines under tension and to take up and give slack to the lines when the bridge is retracted or extended.

6 Claims, 9 Drawing Figures

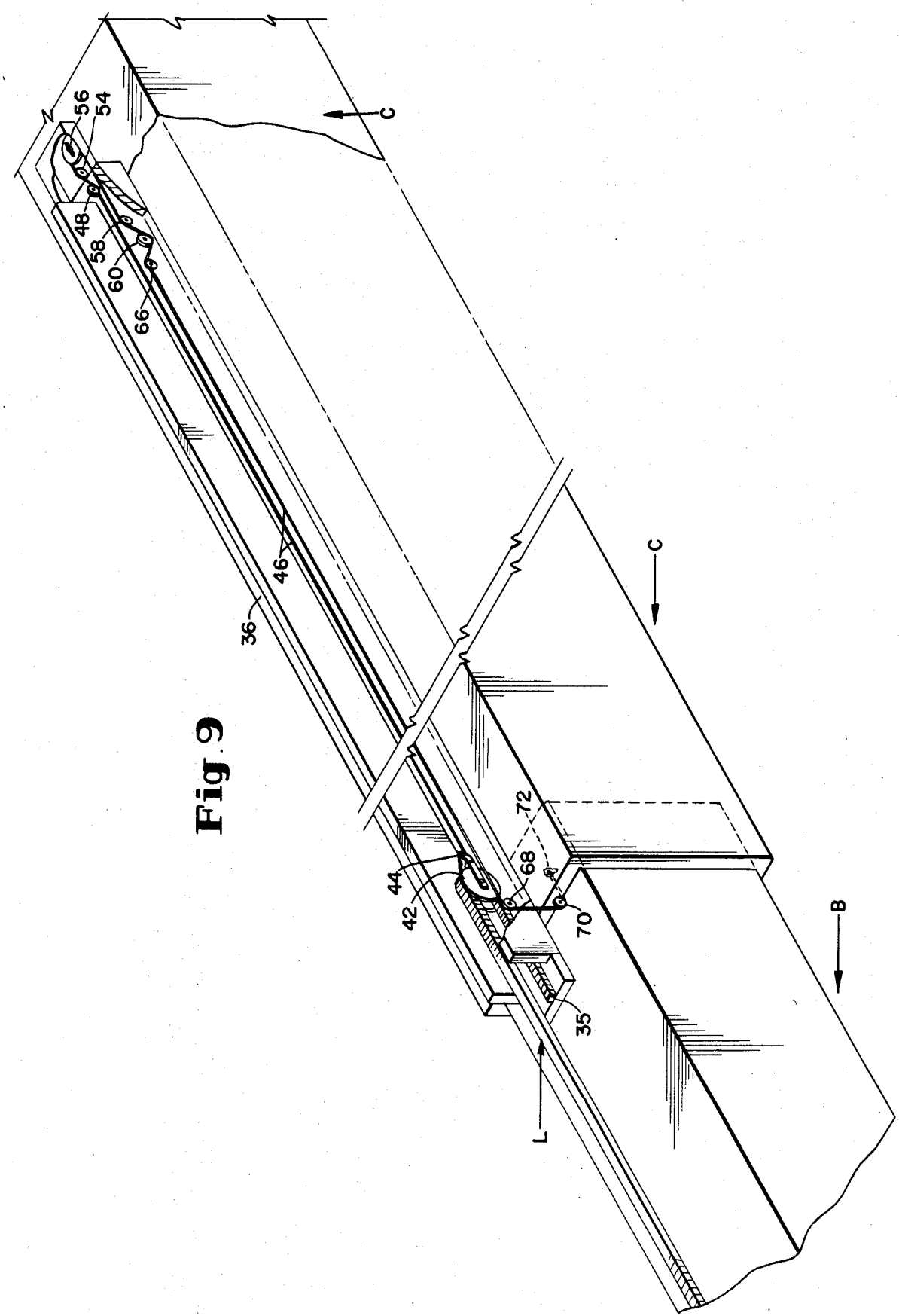

CONDUIT ON PASSENGER LOADING BRIDGE

RELATED APPLICATION

Ser. No. 06/798,960 filed Nov. 18, 1985 by Thomas E. Shepheard for COMBINED PASSENGER LOADING BRIDGE AND UTILITIES CONDUIT BETWEEN AIRPORT TERMINAL AND PARKED AIRCRAFT, now U.S. Pat. No. 4,620,339 of which this application is a continuation-in-part.

FIELD OF INVENTION

Bridges, gangways with lift means, attached to fixed structure at first end with cover and provision to fit vehicle at second end in class 14, subclass 71.5; or electricity, transmission to vehicles, flexible extensions in class 191, subclass 12 R.

BACKGROUND AND OBJECTS

My parent application (supra) discloses an extensible loading bridge comprised of telescoping tunnel sections which extend from a passenger terminal to a parked aircraft, and on which bridge is an extensible flexible carrier which accommodates flexible supply and return hoses which connect a source of hot or cold liquid at the terminal to a heat exchanger on the outboard end of the bridge. Hot or cold liquid, such as water or a mixture of water and glycol is fed through the supply hose and hot or cold air is blown from the heat exchanger to the aircraft. Other utility conduits such as electric power cables and communication lines are also housed in the carrier. The outer end of the flexible carrier terminates in a loop housed in an elongate hollow casing which extends lengthwise over the outermost tunnel section, the loop varying in length as the bridge extends or retracts, i.e.; when the bridge is extended the loop is short, and when the bridge is retracted the loop becomes long. The original embodiment of the invention provided the slack as needed for varying lengths of the bridge, but under certain conditions lengthwise opposing compression forces developed between opposite ends of the carrier which forces tend to cause the carrier to hump or buckle. The improvement provided by this invention is a means for maintaining the flexible carrier and the conduits housed therein under tension so that it cannot hump or buckle.

The means for accomplishing the foregoing object will be apparent from the following specification and drawings, in which:

FIGS. 8 and 9 are diagramatic views showing the action of the cable system when the bridge is retracted (FIG. 8) and extended (FIG. 9).

Figure 1:
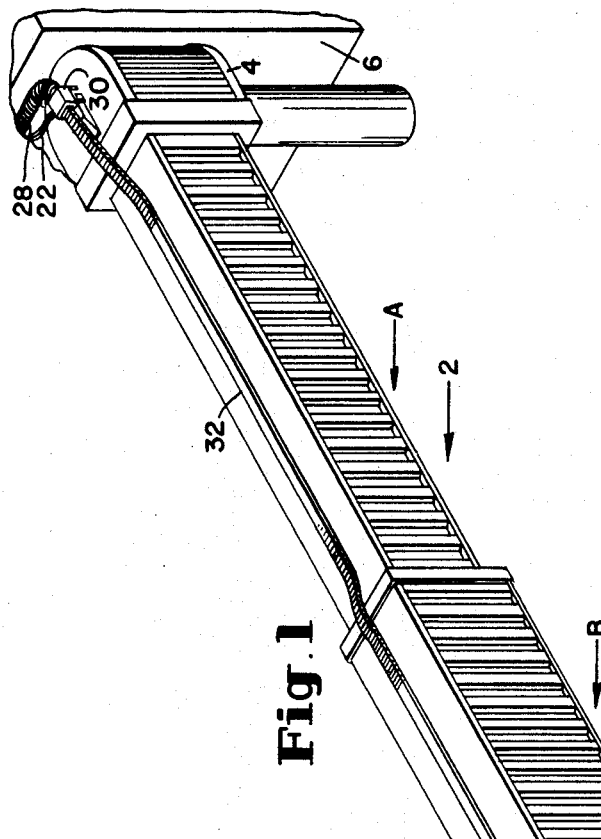
FIG. 1 is a perspective view of a typical passenger loading bridge with the invention supported on the top thereof.
Figure 2:
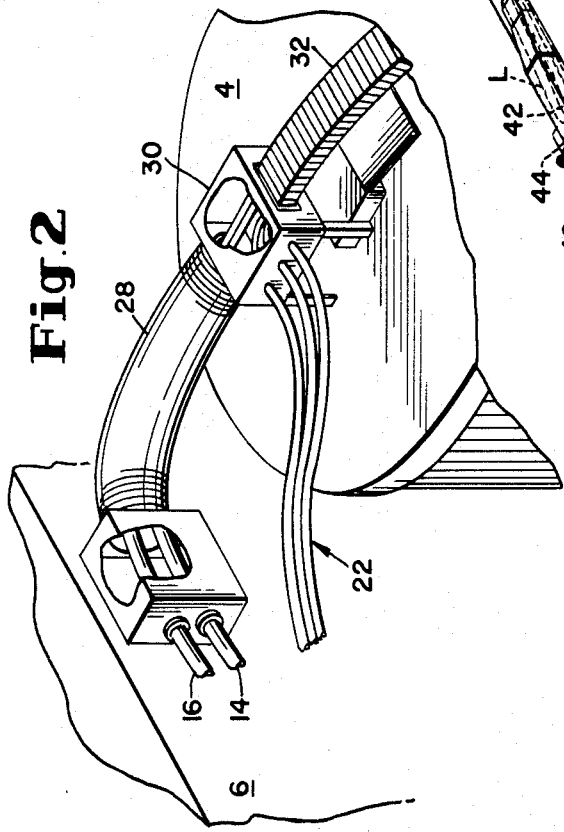
FIG. 2 is a fragmentary perspective view showing the inboard end of the bridge, the carrier and the supply and return hoses and power lines.
Figure 3:
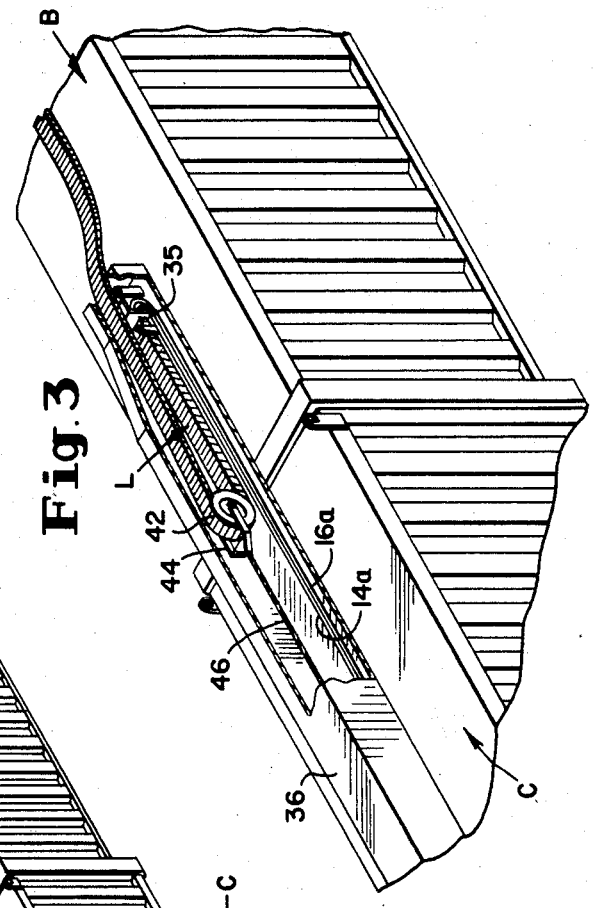
FIG. 3 is a perspective fragmentary view showing the carrier looped around the spool.
Figure 4:
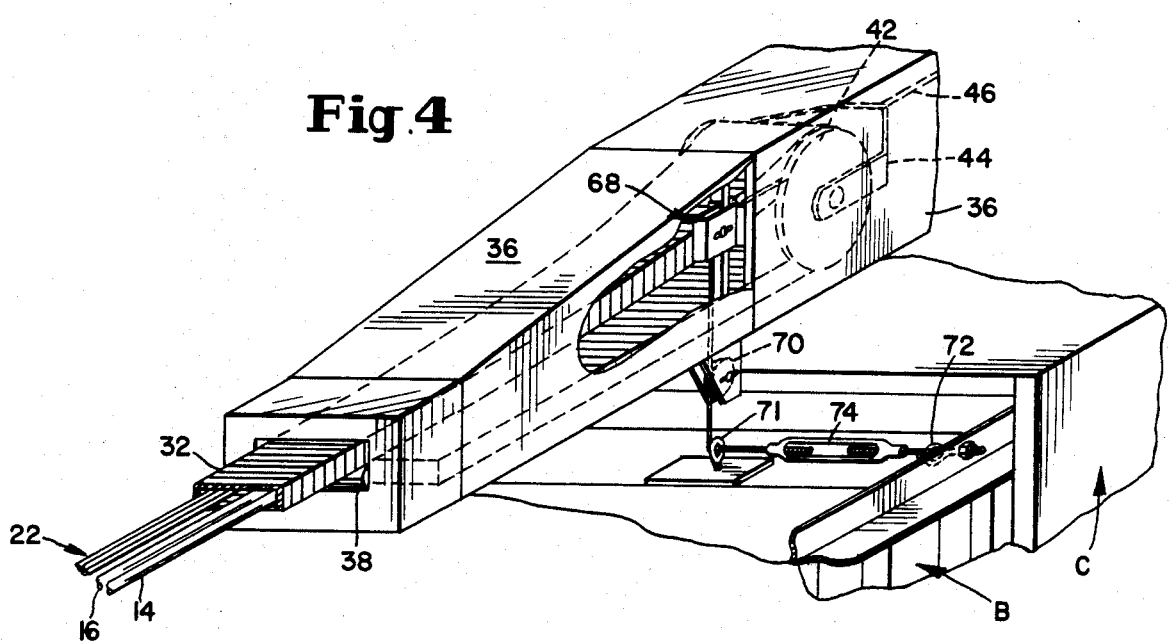
FIG. 4 is a fragmentary diagram illustrating the running of the cable to its anchorage on the next to the outermost bridge section.
Figure 7:
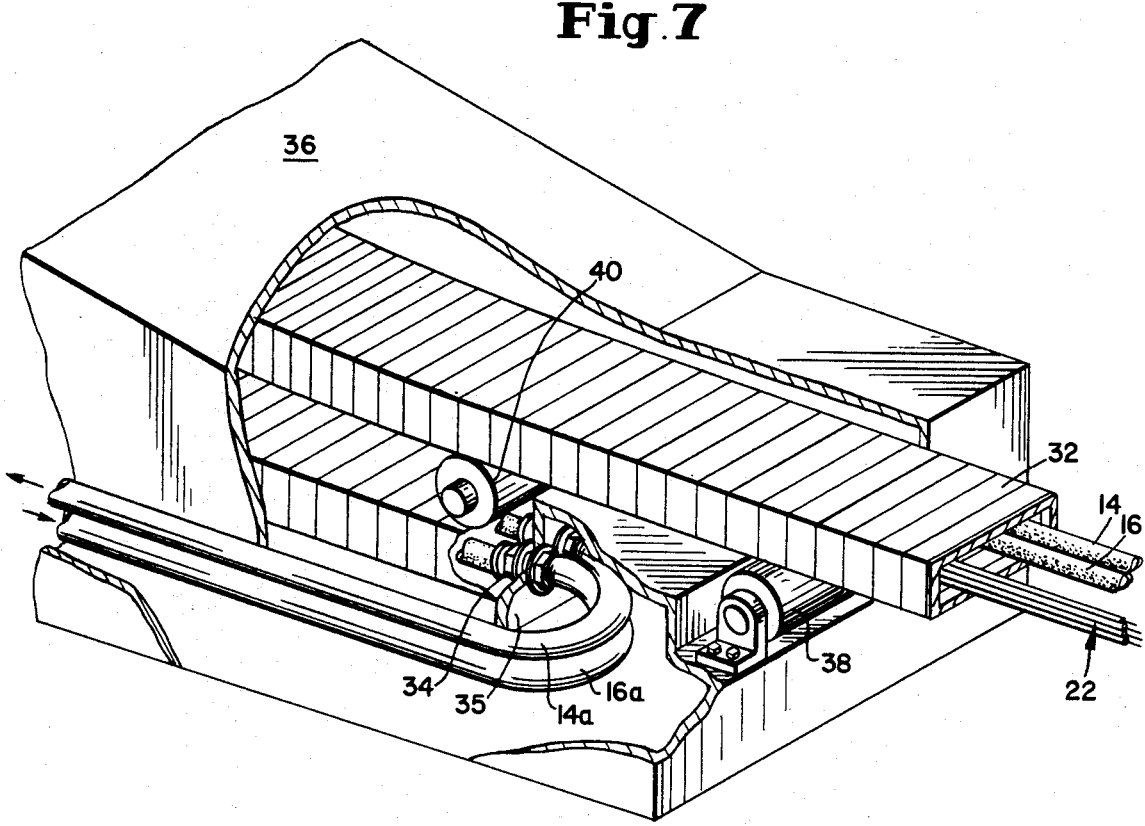
FIG. 7 is a fragmentary perspective view, partly broken away, illustrating the supply and return line hose and pipe lines and the anchorage of the outboard end of the carrier.
Figures 5, 6:
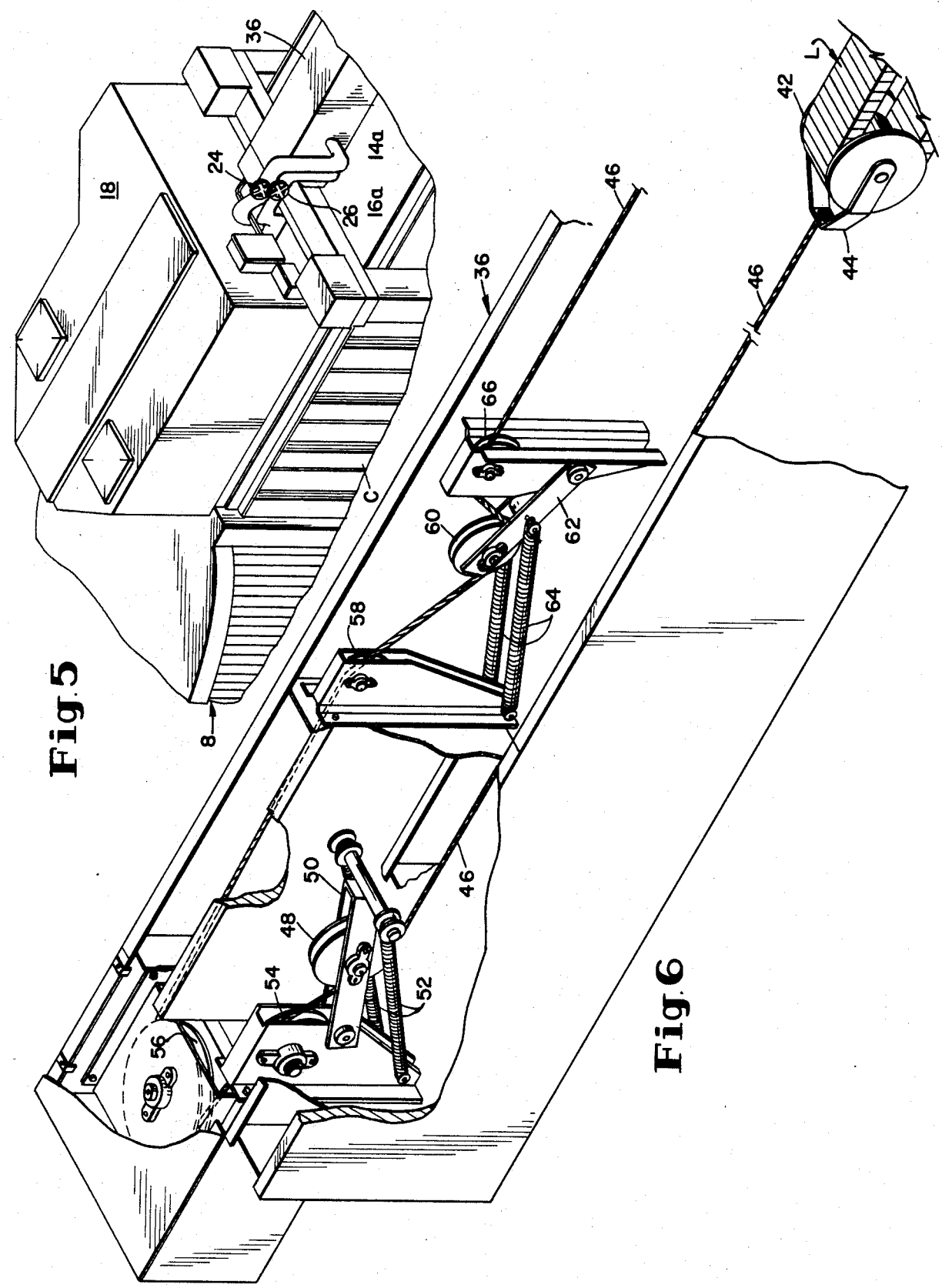
FIG. 5 is a fragmentary perspective view showing the connection of the supply and return pipes with the heat exchanger.
FIG. 6 is a perspective view illustrating the cable tensioning means at the outboard end of the system.

Referring now to the drawings in which like reference numerals denote similar elements, the passenger loading bridge 2 comprises telescoping tunnel sections A, B and C. The inboard end of tunnel A is mounted on a turret 4 supported on a terminal 6 and the outboard end 8 is supported on wheels 10 and may be raised and lowered by jacks 12 as needed to register with the door of an aircraft (not shown). It should be understood that there is a source of hot or cold liquid of conventional design (defined in the claims as fluid-temperature modifying means) at the terminal which liquid is piped from the source via supply and return line hoses 14 and 16 (FIG. 2) which connect to a heat exchanger 18 adjacent the outboard end of the outermost tunnel section C and from which hot or cold air is blown via a large flexible tube 20 to the parked aircraft. In addition to the supply and return hoses there are power lines 22 and, if desired, communication cables (FIG. 5) which supply power and signals to the aircraft. Valves 24, 26 are provided at the outboard end of the supply and return pipes 14A, 16A described further herein. As best shown in FIGS. 1 and 2, a box-like structure 30 provides anchorage for the inner end of a flexible carrier 32 which runs along the top of tunnel sections A and B, the outer end of the carrier being anchored at 34 to a transverse wall 35 of a hollow casing 36 which runs along the top of the outermost tunnel section C. The outer end portion of the flexible carrier 32 is looped back upon itself as indicated by the letter L and this looped-back portion provides or takes up the slack needed to accommodate the length of the carrier to the length of the bridge. As indicated in FIG. 7 the flexible carrier is supported on rollers 38 and 40 and on other rollers (not shown) as needed to support it on the tops of the tunnel sections A and B. As diagrammatically illustrated in FIG. 7 the outer end of flexible supply and return hoses 14 and 16 are coupled to rigid pipes 14A, 16A which extend to the outer end of casing 36 where they are connected to a heat exchanger (FIG. 5). The structure thusfar described is essentially that disclosed in my parent application (supra). The present invention is as follows:

As shown best in FIGS. 1 and 8-10, the loop L of the flexible carrier rolls around a spool 42 and the spool is connected by a yoke 44 to a cable 46. The cable extends outwardly through hollow casing 36 to a tensioning system (FIG. 6) consisting of an idler 48 under which the cable runs, the idler being mounted in a pivoted frame 50 which is pulled downwardly by tension springs 52. From beneath idler 48 cable 46 runs over a guide pulley 54 to a turn-around pulley 56 and thence over a guide pulley 58 to another spring-tensioning idler 60 whose supporting arms 62 are pulled downwardly by tensioning spring 64. From beneath idler 60 cable 46 runs over a guide pulley 66 and thence over pulleys 68 and 70 (FIGS. 4, 8 and 9) on the inner end of tunnel section C and thence outwardly to an anchorage 72 on the outer end of tunnel section B. As detailed in FIG. 4, the outer end of cable passes through an eye 71 on top of the outer end portion of tunnel section B and thence to the anchorage 72. A turn buckle 74 may be used to tighten or loosen the cable as needed.

Figure 8:
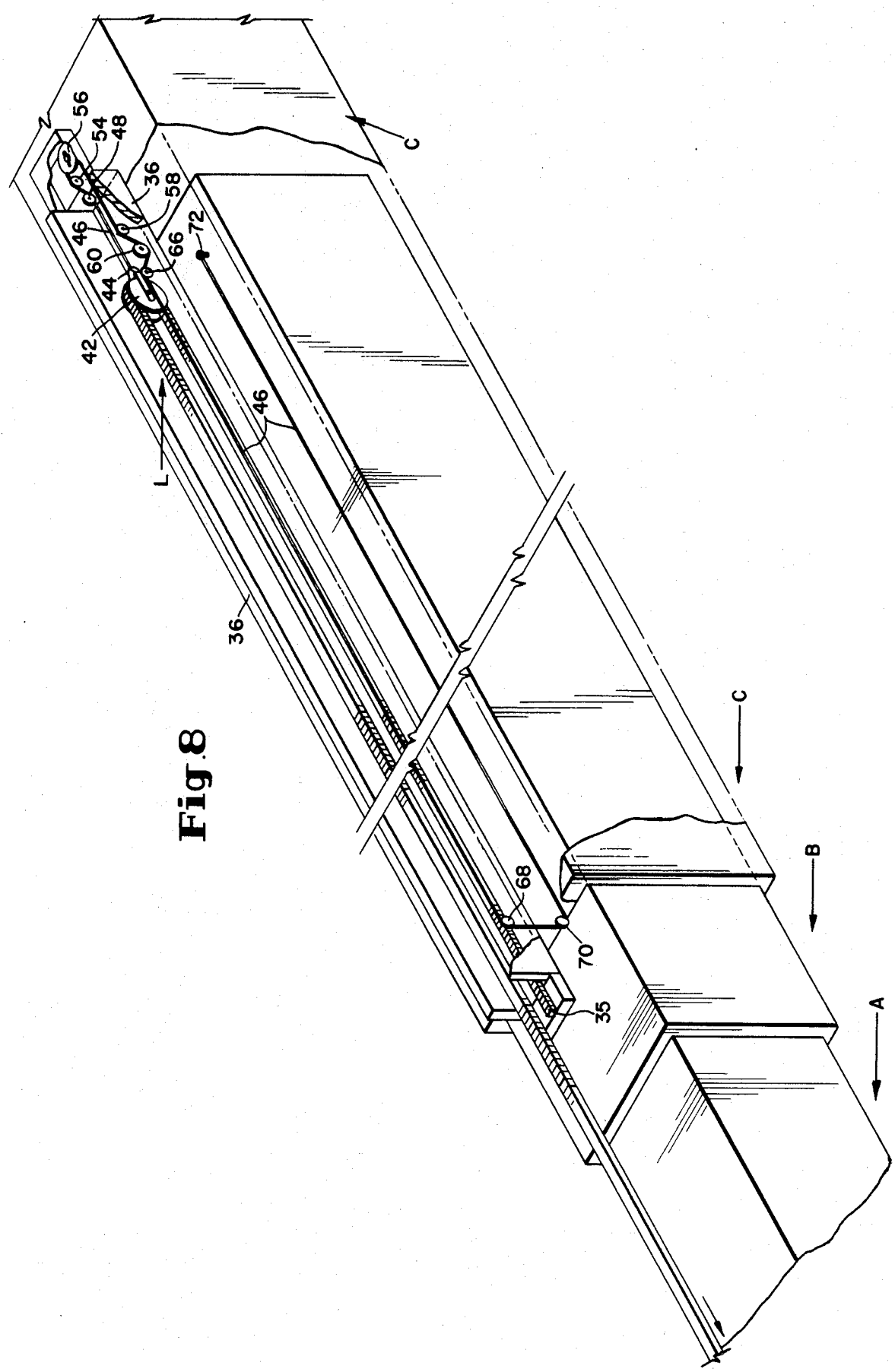

The operation of the cable system is best shown in the diagrams of FIG. 8 and FIG. 9. When the bridge is in retracted (FIG. 8) condition, and the looped-back portion L of the carrier is long so as to take up the slack, the outward movement of the point of anchorage 70 of the cable has moved outwardly so as to pull the spool 42 outwardly, thereby to maintain the flexible carrier 32 under tension; and when the bridge extends (FIG. 9) the point of anchorage 72 of the cable end on tunnel section B has moved to its outer extremity, thereby permitting spool 42 to move inwardly (towards the terminal) thereby shortening the length of the loop L and consequently permitting the flexible carrier to assume its maximum length with respect to the bridge.

Several different types of flexible carriers are available on the open market, these carriers in general being formed of frame-like sections loosely joined to one another so that the carrier can turn around a 180° bend.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In combination with an extensible-retractable bridge having an inner end connected to an aircraft terminal and an outer end adapted to be connected to a parked aircraft,
    said bridge being comprised of a plurality of telescoping tunnel sections whose adjacent ends overlap to greater or lesser extents according to the extension or retraction of the bridge,
    a heat exchanger on the outermost tunnel section,
    a fluid-temperature modifying means for supplying hot or cold liquid to the inner end of the bridge,
    and fluid transmission means for supplying the temperature-modified liquid to the heat exchanger,
    said fluid transmission means including;
    flexible hose means supported on said bridge and extending lengthwise thereof,
    means for anchoring inner end portions of the hose means to the innermost tunnel section and means for anchoring outer end portions of the hose means to the outermost tunnel section adjacent the inner end thereof,
    means for connecting the outer end portions of the hose means to the heat exchanger,
    the outer end portions of said hose means extending from the points of anchorage thereof towards the outer end of the bridge and thence looping back towards the inner end of the bridge, the looped-backed portion of the hose means providing and taking up slack in the hose means in accordance with decrease and increase in the length of the bridge,
    and tension means connected between one of the bridge sections and the hose means for maintaining the hose means under tension.

2. The combination claimed in claim 1, said means for maintaining tension comprising a take up spool around which said hose means is looped, a cable attached at one end to said take-up spool, means for attaching the other end of said cable to one of said bridge sections, and yieldable means for maintaining said cable under tension.

3. The combination claimed in claim 2, and an elongate housing on said outer end tunnel member, the looped-back portion of said flexible tubes being disposed within said housing, said liquid supply and return conduits including rigid pipe portions disposed within said housing and having inner end portions connected to the flexible hose portions of said liquid supply conduits and outer end portions connected to the heat exchanger.

4. The combination claimed in claim 3, said housing extending along the length of the outer end member of the bridge and having an inner end portion overlapping the next adjacent bridge member.

5. In combination with an extensible-retractable bridge comprised of overlapping tunnel sections for connecting an aircraft terminal to a parked aircraft which bridge includes an innermost tunnel section having an inboard end adjacent to the terminal and an outermost tunnel section having an outboard end adapted for connection to the aircraft, characterized in that the length of overlap of said sections varies in accordance with variations in the total length of the bridge,
    a source of temperature-modifying liquid adjacent the innermost tunnel section,
    a heat exchanger on the outermost tunnel section,
    a liquid transmission system for supplying said liquid from said source to said heat exchanger, said system comprising;
    flexible hose means supported on the top of the bridge and running from the inboard end of the innermost tunnel section to a point of anchorage on the outermost tunnel section,
    means for connecting the hose means from the point of anchorage thereof on the outermost tunnel section on the heat exchanger,
    said hose means having an outer end portion which extends from the point of anchorage thereof towards the outboard end of the outermost tunnel section of the bridge, around a loop and thence back towards the innermost tunnel section of the bridge,
    and means for taking up slack in said hose means comprising a take-up spool engaged in the loop,
    a cable connected to said spool and running therefrom towards the outboard end of the outermost tunnel section of the bridge and thence around a pulley system supported on the outermost tunnel section and thence turning back to a point of anchorage on a next adjacent tunnel section, whereby the position of the take-up spool relative to the point of anchorage of the hose means varies in accordance with variations in the length of overlap of the bridge sections.

6. The combination claimed in claim 5, said pulley system including spring-pulled idler pulley means for taking up slack in the cable and for providing yieldable tensioning means therefor.

* * * * *